United States Patent [19]

Maruyama

[11] Patent Number: 4,899,191

[45] Date of Patent: Feb. 6, 1990

[54] EXPOSURE CONTROL APPARATUS FOR LENS-SHUTTER TYPE CAMERA

[75] Inventor: Atsushi Maruyama, Yokohama, Japan

[73] Assignee: Olympus Optical Co., Ltd., Tokyo, Japan

[21] Appl. No.: 316,504

[22] Filed: Feb. 27, 1989

[30] Foreign Application Priority Data

Mar. 10, 1988 [JP] Japan .................................. 63-55011
Mar. 22, 1988 [JP] Japan .................................. 63-65905

[51] Int. Cl.$^4$ ...................... G03B 7/097; G03B 17/16; G03B 15/03; G03B 5/00
[52] U.S. Cl. .................................. 354/421; 354/435; 354/137; 354/195.11
[58] Field of Search ............... 354/419, 420, 421, 422, 354/423, 435, 437, 137, 195.11

[56] References Cited

U.S. PATENT DOCUMENTS 4,724,455 2/1988 Suzuki et al. .................... 354/421 X

FOREIGN PATENT DOCUMENTS 53-24277 6/1978 Japan .
61-162032 7/1986 Japan .
61-269130 11/1986 Japan .

*Primary Examiner*—W. B. Perkey
*Attorney, Agent, or Firm*—Frishauf, Holtz, Goodman & Woodward

[57] ABSTRACT

A first table for storing a correspondence between an exposure value and a shutter-blade aperture time and a second table for storing a correspondence between an exposure value and an effective exposure time are prepared at a specific focal length. A correction circuit corrects the exposure value for the first and second tables in accordance with a focal length of a lens. A comparator compares the corrected exposure value for the first table with a full-open exposure value to determine whether correct exposure can be obtained before or after a full-open of the shutter blades. A selector supplies the corrected exposure value to the first table when correct exposure is obtained before the full-open of the shutter blades, and supplies the full-open exposure value when correct exposure is obtained after the full-open. The shutter-blade aperture time and the effective exposure time output from the first and second tables are input to a shutter-close timing calculator. When correct exposure is obtained before the full-open of the shutter blades, a shutter-close timing is determined using the shutter-blade aperture time. When correct exposure is obtained after the full-open, the shutter-close timing is determined using a sum of the effective exposure time and a half of the shutter-blade aperture time obtained from the first table on the basis of the full-open exposure value.

10 Claims, 6 Drawing Sheets

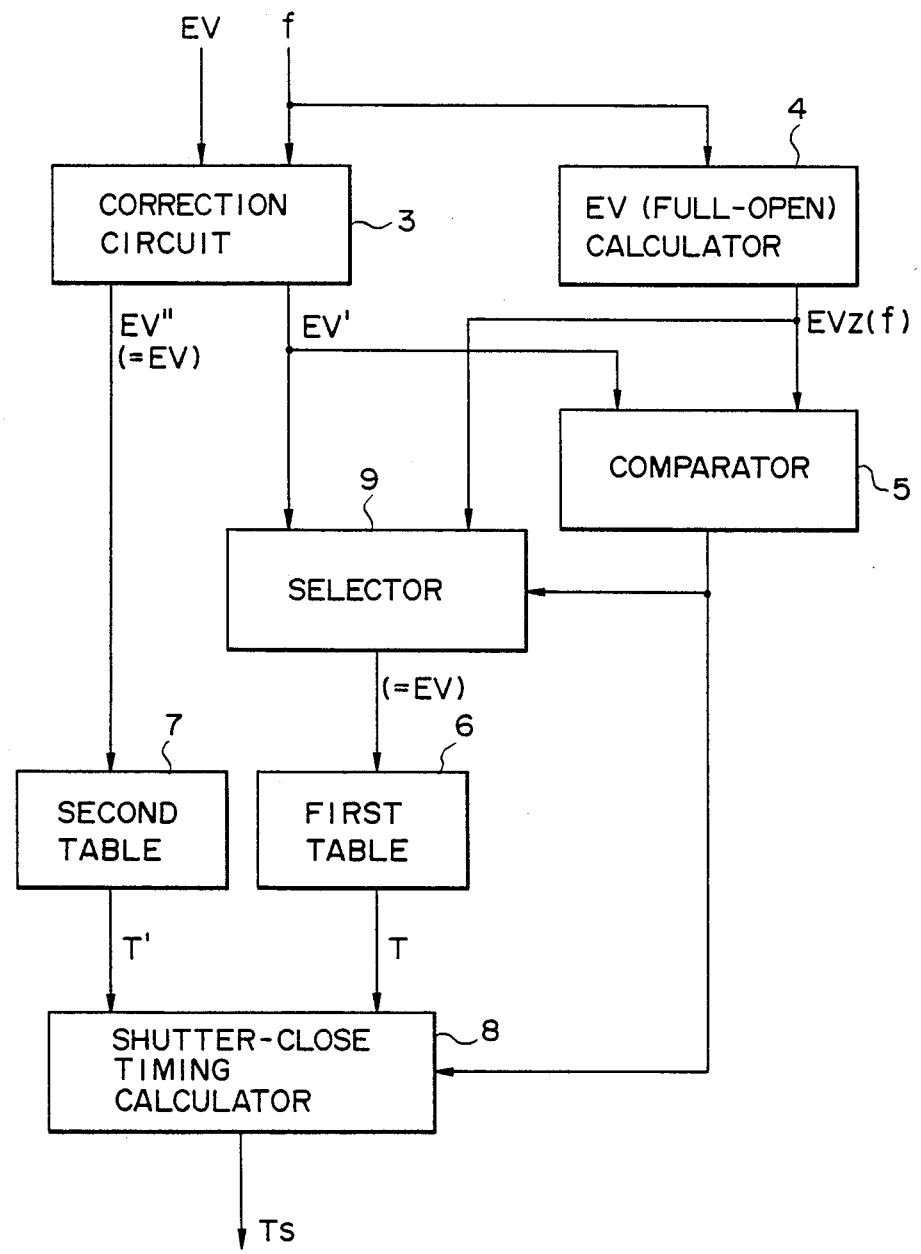
F I G. 1

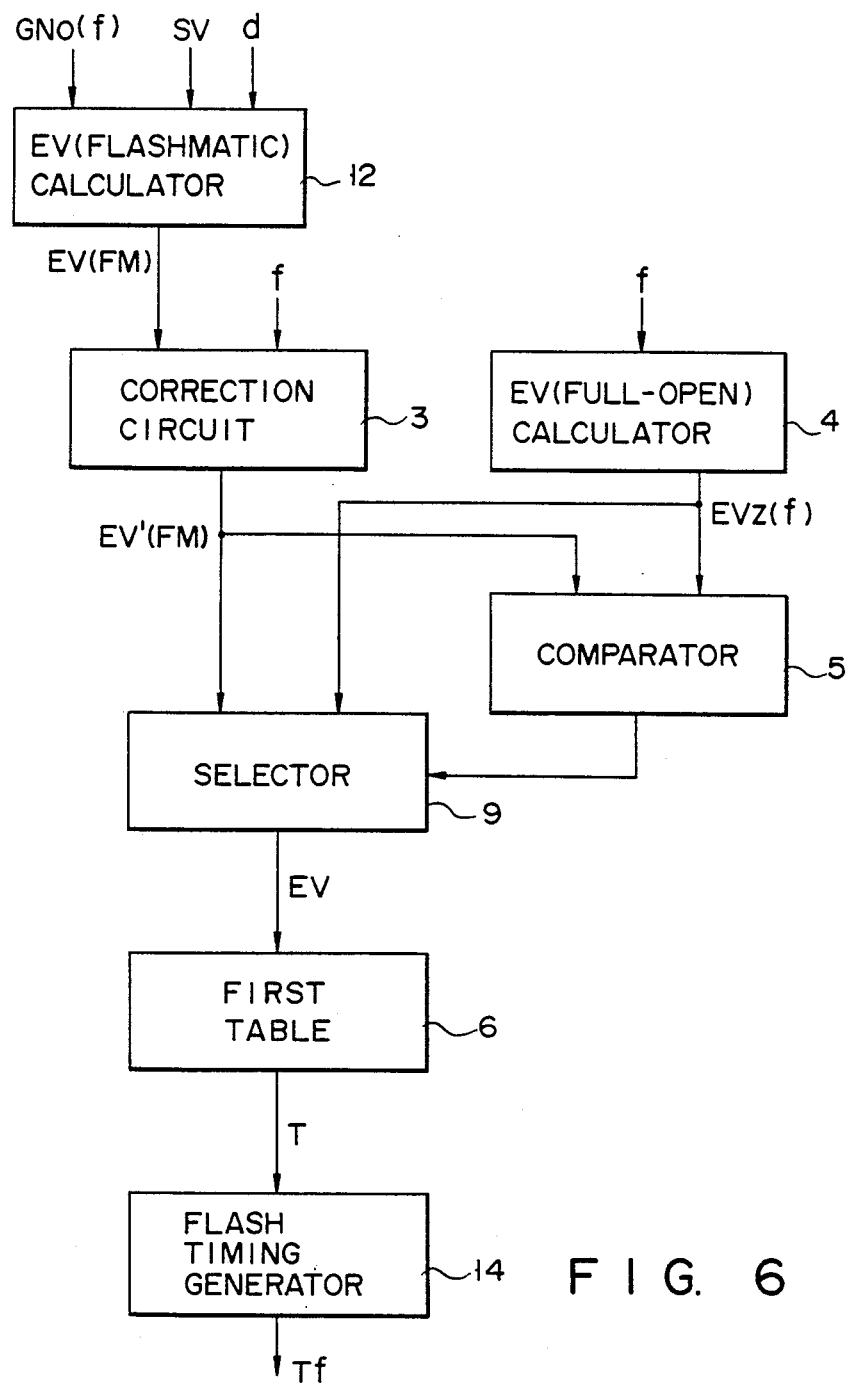
F I G. 6

EXPOSURE CONTROL APPARATUS FOR LENS-SHUTTER TYPE CAMERA

BACKGROUND OF THE INVENTION

1. Field of the Invention

The present invention relates to an exposure control apparatus for a lens-shutter type camera with a zoom lens or plural lenses which can change a focal length of a photographing lens, and can change a full-open aperture size along with a change in focal length.

2. Description of the Related Art

A prior art apparatus of this type is disclosed in Japanese Patent Disclosure (Kokai) No. 61-162032. In this patent, a correspondence between a luminance value and a shutter speed at one focal length is stored in the form of a table. When the focal length upon photographing is changed from that of the table, the luminance value is corrected in accordance with the focal length in order to take a change in full-open aperture size into consideration, so that the luminance value is shifted on the table. Thereafter, the shutter speed is determined from this table.

However, in this exposure control method, a shutter speed can be determined in only the so-called triangular aperture region where an aperture size changes as shutter blades (sectors) are opened. More specifically, exposure control can be performed only when correct exposure is obtained before a full-open state of the shutter blades. If a long exposure time is controlled when an object to be photographed is dark and correct exposure can be obtained after the full-open state of the shutter blades, a gamma characteristic of the photometric element is changed to shift the time at which the shutter flades are fully opened. If the change is done by a switch as disclosed in Japanese Utility Model Publication (Kokoku) No. 53-24277, a mechanical system is complicated.

When a flashmatic type electronic flash is provided to a camera of this type, a flash start timing of the electronic flash must be controlled in accordance with an object distance, so that the flash emits light when an aperture is opened to a predetermined aperture size. In this case, if the focal length is changed, an aperture value is changed if the aperture size remains the same. Thus, the aperture size defining a flash timing must be changed in accordance with a focal length even for an object under an identical condition. For this purpose, a flash control apparatus for a camera is disclosed in Japanese Patent Disclosure (Kokai) No. 61-269130. In this apparatus, the correspondence among an object distance, a film sensitivity, and a flash timing is stored in the form of a table, and the film sensitivity on the table is shifted in accordance with a change in focal length, so that a flash timing for all the focal lengths can be obtained using one table.

However, the table for obtaining the flash timing is separate from a table storing the correspondence between an exposure value for exposure control and a shutter-close timing. Thus, two tables are necessary, and a storage capacity of a ROM must be increased, resulting in high cost. Further, a case wherein a flash guide number is changed along with a change in focal length is not taken into consideration.

SUMMARY OF THE INVENTION

The present invention has been made in consideration of the above situation, and has as its object to provide an exposure control apparatus which can easily control long-time exposure in which correct exposure is obtained after shutter blades are fully opened in a lens-shutter camera which has shutter blades also serving as an aperture and changes a full-open aperture size along with a change in focal length of a lens.

It is a second object of the present invention to provide an exposure control apparatus which can perform exposure control under natural light and flashmatic control with a very simple method in a lens shutter camera which has shutter blades also serving as an aperture and changes a full-open aperture size and a flash guide number along with a change in focal length of a lens.

An exposure control apparatus for a lens-shutter camera according to the present invention comprises: a first table for storing a correspondence between an exposure value and a shutter-blade aperture time (actual aperture time of the shutter blade) at a specific focal length; a second table for storing a correspondence between an exposure value and an effective exposure time (aperture time of the shutter blade which is assumed to be fully opened from the start of exposure) at the specific focal length; a correction circuit for correcting the exposure value for the first and second tables in accordance with a difference between the specific focal length and a focal length of a lens to calculate first and second corrected exposure values; a calculator for calculating a full-open exposure value corresponding to an exposure value with which shutter blades are fully opened, in accordance with the focal length of the lens; a comparator for comparing the first corrected exposure value and the full-open exposure value to determine whether correct exposure can be obtained before or after the shutter blades are fully opened; a selector for supplying the first corrected exposure value or the full-open exposure value to the first table in accordance with an output from the comparator, the selector supplying the first corrected exposure value to the first table when correct exposure is obtained before the shutter blades are fully opened and supplying the full-open exposure value to the first table when correct exposure can be obtained after the shutter blades are fully opened; and a circuit for determining a shutter-blade close timing from the outputs from the first and second tables in accordance with the output from the comparator, the circuit determining the close timing using the shutter-blade aperture time output from the first table on the basis of the first corrected exposure value when correct exposure is obtained before the shutter blades are fully opened, and determining the close timing using a sum of the effective exposure time output from the second table on the basis of the second corrected exposure value and a half of the shutter-blade aperture time output from the first table on the basis of the full-open exposure value when correct exposure is obtained after the shutter blades are fully opened.

Another exposure control apparatus for a lens-shutter camera according to the present invention, comprises: a calculator for calculating a pseudo exposure value equivalent to an aperture value in a flashmatic mode on the basis of object distance data, film sensitivity data, and guide number data; a table for storing a correspondence between an exposure value and a shutter-blade aperture time at a specific focal length; a correction circuit for correcting the pseudo exposure value in accordance with a difference between the specific focal length and a focal length of a lens; a circuit for calculating a full-open exposure value corresponding to an exposure value with which shutter blades are fully opened, in accordance with the focal length of the lens; a comparator for comparing a corrected exposure value and the full-open exposure value; a selector for supplying the corrected exposure value or the full-open exposure value to the table in accordance with a comparison result of the comparator, the selector supplying a larger one of the corrected exposure value and the full-open exposure value to the table; and a circuit for determining a flash start timing in accordance with an output from the table.

BRIEF DESCRIPTION OF THE DRAWINGS

FIG. 1 is a principle block diagram of a first embodiment of an exposure control apparatus according to the present invention;

FIG. 6 is a principle block diagram of a second embodiment of an exposure control apparatus according to the present invention;

DETAILED DESCRIPTION OF THE PREFERRED EMBODIMENTS

Figure 2:
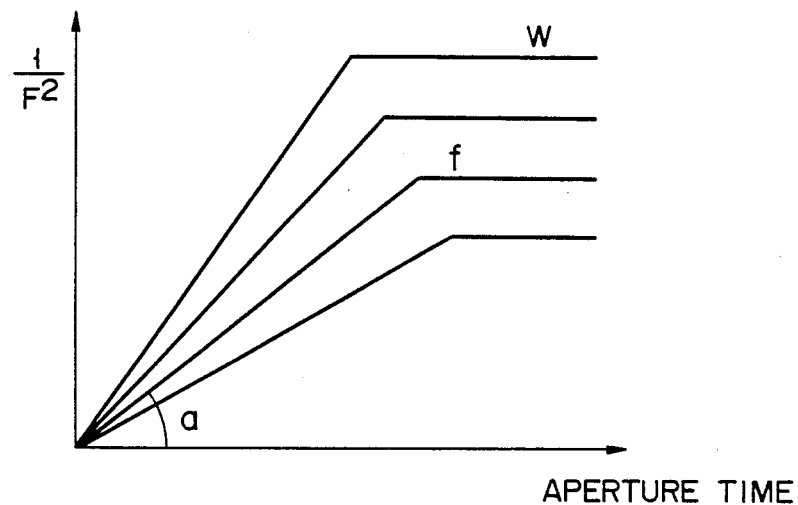
FIG. 2 is a graph showing a change in aperture waveform of shutter blades upon a change in focal length.

An embodiment of an exposure control apparatus for a lens-shutter camera according to the present invention will be described with reference to the accompanying drawings.

FIG. 1 is a principle block diagram of a first embodiment. A camera of this embodiment has shutter blades also serving as an aperture and a zoom lens or plural lens, and control of a close timing of the shutter blade corresponds to exposure control. When a focal length of a lens is changed, a full-open aperture size of the shutter blades is also changed. For this reason, the correspondence between an exposure value (EV: determined by a luminance value LV and a speed value SV) and a close timing of the shutter blades at a specific focal length is stored as a table, and a shutter-close timing is determined on the basis of an exposure value which is corrected in accordance with a difference between a focal length upon photographing and the specific focal length. As the table, a first table 6 for storing the correspondence between an exposure value and a shutter-blade aperture time (actual apertue time of the shutter blade) used when an exposure is completed before the shutter blades are fully opened, and a second table 7 for storing a correspondence between an exposure value and an effective exposure time (aperture time of the shutter blade which is assumed to be fully opened from the start of exposure) used when an exposure is completed after the shutter blades are fully opened, are prepared. Tables stored as the first and second tables 6 and 7 are formed for the same focal length.

The exposure value EV and focal length data f of the lens are supplied to a correction circuit 3. Since the first and second tables 6 and 7 store the correspondence between the exposure value and the shutter-blade aperture time, and the correspondence between the exposure value and the effective exposure time at the specific focal length, respectively, the exposure value EV must be corrected in accordance with the focal length f so as to refer to these tables at an actual focal length f upon photographing. Thus, the correction circuit 3 performs this correction.

A corrected exposure value EV' for the first table output from the correction circuit 3 is input to a comparator 5 and a selector 9, and a corrected exposure value EV'' for the second table is input to the second table 7.

The focal length f is supplied to the full-open exposure value calculator 4, and an exposure value with which the shutter blades are fully opened, i.e., full-open exposure value EVz(f) is calculated in accordance with the focal length. The full-open exposure value EVz(f) is input to the comparator 5 and the selector 9. The comparator 5 compares the full-open exposure value EVz(f) with the corrected exposure value EV', and determines whether correct exposure can be obtained before or after the shutter blades are fully opened. More specifically, if the corrected exposure value EV' is equal to or larger than the full-open exposure value EVz(f), the comparator 5 determines that correct exposure can be obtained before the shutter blades are fully opened. On the contrary, if the corrected exposure value EV' is smaller than the full-open exposure value EVz(f), the comparator 5 determines that correct exposure can be obtained after the shutter blades are fully opened. The determination result is supplied to the selector 9 and a shutter-close timing calculator 8.

When the comparator 5 determines that correct exposure can be obtained before the shutter blades are fully opened, the selector 9 supplies the corrected exposure value EV' to the first table 6; otherwise, it supplies the full-open exposure value EVz(f) to the first table 6.

A shutter-blade aperture time T output from the first table 6 and an effective exposure time T' output from the second table 7 are input to the shutter-close timing calculator 8. When the comparator 5 determines that correct exposure can be obtained before the shutter blades are fully opened, the calculator 8 determines a close timing Ts of the shutter blades in accordance with the shutter-blade aperture time T obtained from the first table 6 on the basis of the corrected exposure value EV'. On the contrary, when the comparator 5 determines that correct exposure can be obtained after the shutter blades are fully opened, the calculator 8 determines a shutter-close timing Ts in accordance with a sum of the effective exposure time T' obtained from the table 7 on the basis of the corrected exposure value EV'' and a half of the shutter-blade aperture time T obtained from the first table 6 on the basis of the full-open exposure value EVz(f).

The principle of this embodiment will be described below. An aperture size F in a full-open state of the shutter blades also serving as the aperture is changed upon a change in focal length. FIG. 2 shows this change as an aperture waveform of the shutter blades. As can be apparent from FIG. 2, a full-open time from an open start timing to a full-open state of the shutter blades is changed according to a change in focal length.

Determination of the shutter-close timing when correct exposure can be obtained before the shutter blades are fully opened will be described below. In the triangular aperture region where an aperture size is changed as the shutter blades are opened, if a focal length is determined, the exposure value EV and the shutter-blade aperture time T have a predetermined relationship (see equation (7) below). For example, Table 1 below shows a correspondence between the exposure value EV and the shutter-blade aperture time T at a wide end (shortest focal length). A time To(W) until the shutter blades are fully opened at the wide end is about 20 ms, and a full-open aperture value Fo(W) at that time is 4.46. Table 1 includes the shutter-blade aperture time T longer than 20 ms since the table is used after the exposure value EV is shifted. Table 1 is stored in the first table 6 shown in FIG. 1.

TABLE 1

| EV | T (μs) |
|---|---|
| 9.125 | 39421.5 |
| 9.25 | 37750.2 |
| 9.375 | 36149.7 |
| 9.5 | 34617.1 |
| 9.625 | 33149.4 |
| 9.75 | 31744 |
| 9.875 | 30398.2 |
| 10 | 29109.4 |
| 10.125 | 27875.2 |
| 10.25 | 26693.4 |
| 10.375 | 25561.7 |
| 10.5 | 24478 |
| 10.625 | 23440.2 |
| 10.75 | 22446.4 |
| 10.875 | 21494.7 |
| 11 | 20583.4 |
| 11.125 | 19710.8 |
| 11.25 | 18875.1 |
| 11.375 | 18074.9 |
| 11.5 | 17308.5 |
| 11.625 | 16574.7 |
| 11.75 | 15872 |
| 11.875 | 15199.1 |
| 12 | 14554.7 |
| 12.125 | 13937.6 |
| 12.25 | 13346.7 |
| 12.375 | 12780.9 |
| 12.5 | 12239 |
| 12.625 | 11720.1 |
| 12.75 | 11223.2 |
| 12.875 | 10747.4 |
| 13 | 10291.7 |
| 13.125 | 9855.39 |
| 13.25 | 9437.55 |
| 13.375 | 9037.43 |
| 13.5 | 8654.28 |
| 13.625 | 8287.36 |
| 13.75 | 7936 |
| 13.875 | 7599.54 |
| 14 | 7277.34 |
| 14.125 | 6968.81 |
| 14.25 | 6673.36 |
| 14.375 | 6390.43 |
| 14.5 | 6119.49 |
| 14.625 | 5860.05 |
| 14.75 | 5611.6 |
| 14.875 | 5373.69 |
| 15 | 5145.86 |
| 15.125 | 4927.69 |
| 15.25 | 4718.77 |
| 15.375 | 4518.71 |
| 15.5 | 4327.14 |
| 15.625 | 4143.68 |
| 15.75 | 3968 |
| 15.875 | 3799.77 |
| 16 | 3638.67 |
| 16.125 | 3484.4 |

TABLE 1-continued

| EV | T (μs) |
|---|---|
| 16.25 | 3336.68 |
| 16.375 | 3195.21 |
| 16.5 | 3059.75 |
| 16.625 | 2930.02 |
| 16.75 | 2805.8 |
| 16.875 | 2686.84 |
| 17 | 2572.93 |

In this manner, Table 1 shows the correspondence between the exposure value EV and the shutter-blade aperture time T at the wide end. Even when the focal length upon photographing is changed from the wide end, if the exposure value is linearly changed accordingly, the exposure value can be corrected so as to obtain the shutter-blade aperture time T at an arbitrary focal length f using Table 1.

Figure 3:
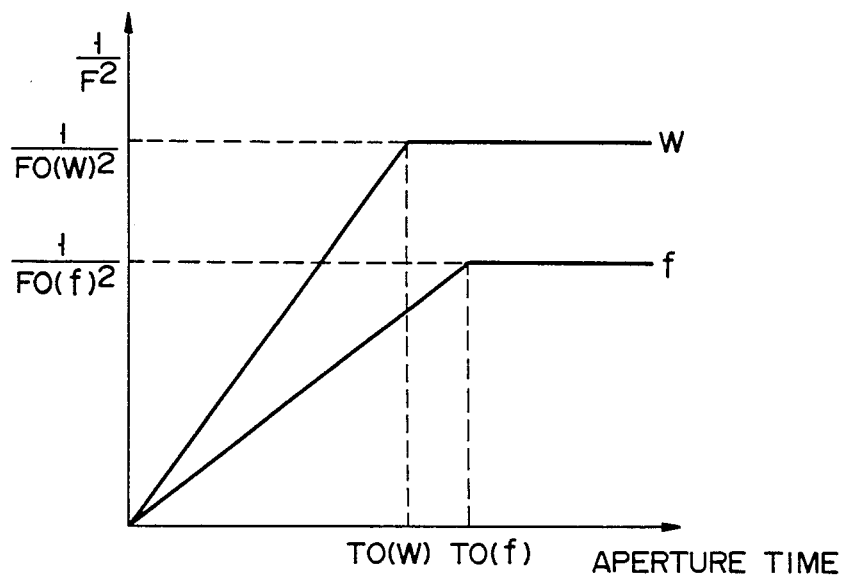
FIG. 3 is a graph showing a difference between an exposure value at a wide end and an exposure value at an arbitrary focal length in the triangular aperture region.

A correction amount $\Delta EV(f)$, i.e., a difference between the exposure value at an arbitrary focal length f and the exposure value at the wide end W at an arbitrary aperture time T in the triangular aperture region shown in FIG. 3 is constant as follows. More specifically, the exposure value is linearly changed along with a change in focal length.

$$\Delta EV(f) = EV(W,T) - EV(f,T) \qquad (1)$$
$$= \log_2\{Fo(W)^2 To(W))/Fo(f)^2 To(f))\}$$

where the parameters are:
 EV(W,T): exposure value at the wide end W at an arbitrary time T
 EV(f,T): exposure value at an arbitrary focal length f at an arbitrary time T
 Fo(W): full-open aperture value at the wide end W
 Fo(F): full-open aperture value at an arbitrary length f
 To(W): time until the shutter blades are fully opened at the wide end W
 To(f): time until the shutter blades are fully opened at an arbitrary focal length f A correction amount $\Delta EV(f)$ can be calculated using equation (1) every time a focal length is changed upon photographing. However, since a change in focal length is finite, the relationship between the focal lengths f and the correction amounts $\Delta EV(f)$ is determined in advance on the basis of equation (1), and is stored as a table, thus allowing high-speed processing. The relationship is summarized in Table 2 below. Table 2 is stored in the correction circuit 3 shown in FIG. 1.

TABLE 2

| f(mm) | ΔEV(f) |
|---|---|
| 40 | 0.000 |
| ... | ... |
| 50 | 0.375 |
| ... | ... |
| 60 | 0.625 |
| ... | ... |
| 70 | 1.000 |
| ... | ... |
| 80 | 1.250 |
| ... | ... |
| 90 | 1.500 |
| ... | ... |
| 100 | 1.750 |

In a triangular aperture region, the exposure value EV is corrected as shown in equation (2), and Table 1 is referred to based on the corrected exposure value EV″ so as to obtain the corresponding shutter-blade aperture time T, thus determining a shutter-blade close timing Ts (=T) at which correct exposure can be obtained at an arbitrary focal length f.

$$EV' = EV - \Delta EV(f) \ldots \quad (2)$$

Figure 4:
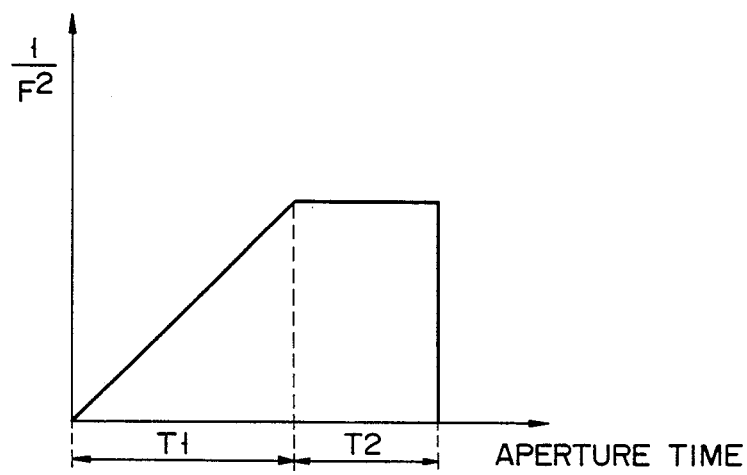
FIG. 4 is a graph for explaining a close timing of shutter blades where correct exposure can be obtained after the shutter blades are fully opened.

A case will be described wherein correct exposure can be obtained after a time T1 at which the shutter blades are fully opened, as shown in FIG. 4. In equation (1), a difference (correction amount) $\Delta EV'(f)$ between an exposure value at the wide end and an exposure value at an arbitrary focal length f not at the arbitrary time T but at a arbitrary effective exposure time T′ is expressed as:

$$\Delta EV'(f) = EV(W,T') - EV(f,T') \quad (3)$$
$$= \log_2(F_o(W)/F_o(f))^2$$

In this case, the correction amounts $\Delta EV'(f)$ for corresponding focal lengths f are determined in advance from equation (3), and are stored in a table. Table 3 below summarizes this. Table 3 is also stored in the correction circuit 3 shown in FIG. 1.

TABLE 3

| f(mm) | $\Delta EV(f)$ |
|---|---|
| 40 | 0.000 |
| ... | ... |
| 50 | 0.125 |
| ... | ... |
| 60 | 0.250 |
| ... | ... |
| 70 | 0.375 |
| ... | ... |
| 80 | 0.500 |
| ... | ... |
| 90 | 0.750 |
| ... | ... |
| 100 | 0.875 |

More specifically, if the exposure value EV and a correction amount $\Delta EV'(f)$ at each focal length in equation (3) are known like in the case of the triangular aperture region, an exposure value is corrected based on the following equation, and Table 4 is referred to using the corrected exposure value EV″ as the exposure value EV, thus determining an effective exposure time T′ at an arbitrary focal length. Table 4 is stored in the second table 7 shown in FIG. 1.

$$EV'' = EV - \Delta EV'(f) \ldots \quad (4)$$

TABLE 4

| EV | T′ (μs) |
|---|---|
| 11.875 | 5775.3 |
| 11.75 | 6298.01 |
| 11.625 | 6868.03 |
| 11.5 | 7489.64 |
| 11.375 | 8167.51 |
| 11.25 | 8906.73 |
| 11.125 | 9712.86 |
| 11 | 10591.9 |
| 10.875 | 11550.6 |
| 10.75 | 12596 |
| 10.625 | 13736.1 |
| 10.5 | 14979.3 |
| 10.375 | 16335 |
| 10.25 | 17813.5 |
| 10.125 | 19425.7 |

TABLE 4-continued

| EV | T′ (μs) |
|---|---|
| 10 | 21183.9 |
| 9.875 | 23101.2 |
| 9.75 | 25192 |
| 9.625 | 27472.1 |
| 9.5 | 29958.6 |
| 9.375 | 32670 |
| 9.25 | 35626.9 |
| 9.125 | 38851.4 |
| 9 | 42367.8 |
| 8.875 | 46202.4 |
| 8.75 | 50384.1 |
| 8.625 | 54944.2 |
| 8.5 | 59917.1 |
| 8.375 | 65340.1 |
| 8.25 | 71253.8 |
| 8.125 | 77702.9 |
| 8 | 84735.6 |
| 7.875 | 92404.8 |
| 7.75 | 100768 |
| 7.625 | 109888 |
| 7.5 | 119834 |
| 7.375 | 130680 |
| 7.25 | 142508 |
| 7.125 | 155406 |
| 7 | 169471 |
| 6.875 | 184810 |
| 6.75 | 201536 |
| 6.625 | 219777 |
| 6.5 | 239668 |
| 6.375 | 261360 |
| 6.25 | 285015 |
| 6.125 | 310812 |
| 6 | 338942 |
| 5.875 | 369619 |
| 5.75 | 403073 |
| 5.625 | 439554 |
| 5.5 | 479337 |
| 5.375 | 522721 |
| 5.25 | 570031 |
| 5.125 | 621623 |
| 5 | 677885 |
| 4.875 | 739238 |
| 4.75 | 806145 |
| 4.625 | 879108 |
| 4.5 | 958674 |
| 4.375 | 1.04544E + 06 |
| 4.25 | 1.14006E + 06 |
| 4.125 | 1.24325E + 06 |
| 4 | 1.35577E + 06 |
| 3.875 | 1.47848E + 06 |
| 3.75 | 1.61229E + 06 |
| 3.65 | 1.75822E + 06 |
| 3.5 | 1.91735E + 06 |
| 3.375 | 2.09088E + 06 |

If a time until the shutter blades are fully opened as shown in FIG. 4 is represented by T1, and a time after the shutter blades are fully opened until the shutter blades are closed is represented by T2, a time T1 + T2 from the beginning of opening to closing of the shutter blades can be expressed as follows using the effective exposure time T′:

$$T1 + T2 = T1 + (T' - 0.5 \times T1) \quad (5)$$
$$= T' + 0.5 \times T1$$

Whether correct exposure is obtained before or after the shutter blades are fully opened at each focal length can be determined by comparing the full-open exposure value EVz(f) with which the shutter blades are fully opened and the corrected exposure value EV′ for the first table. If EV′ ≧ EVz(f), it can be determined that correct exposure is obtained before the shutter blades are fully opened, and if EV′ < EVz(f), it can be determined that correct exposure is obtained after the shutter blades are fully opened. The full-open exposure value $EVz(f)$ can be uniquely determined at each focal length, and is determined in advance in correspondence with the focal lengths. Table 5 shows this. Table 5 is stored in the full-open exposure value calculator 4 shown in FIG. 1.

TABLE 5

| f(mm) | EVz(f) |
|-------|--------|
| 40 | 11.000 |
| ... | ... |
| 50 | 10.500 |
| ... | ... |
| 60 | 10.125 |
| ... | ... |
| 70 | 9.875 |
| ... | ... |
| 80 | 9.625 |
| ... | ... |
| 90 | 9.500 |
| ... | ... |
| 100 | 9.375 |

Figure 5:
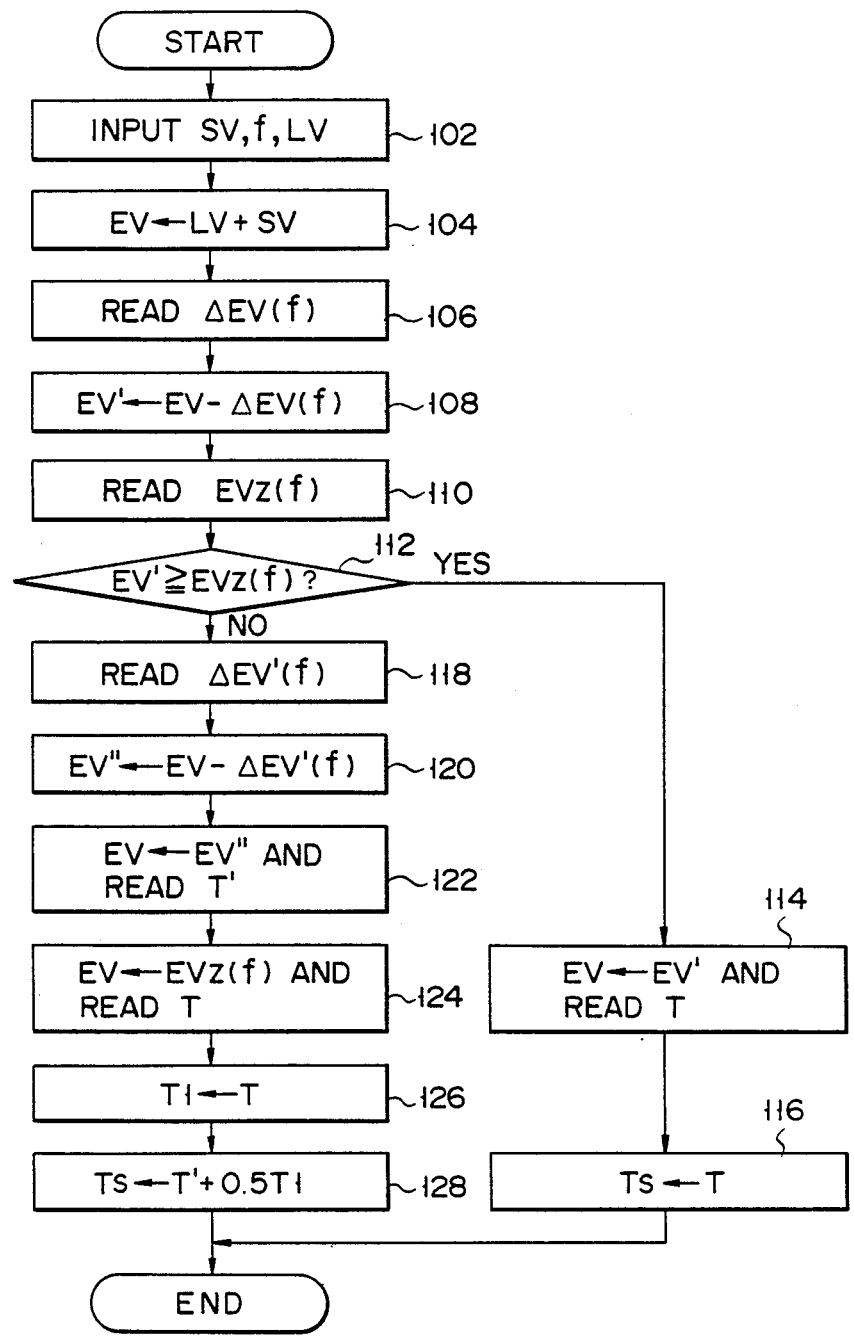
FIG. 5 is a flow chart showing exposure control according to first embodiment.

FIG. 5 shows a flow chart of exposure control according to the first embodiment based on the above-mentioned principle.

In step 102, speed value SV representing film sensitivity (ISO) data and supplied from a detector arranged in a patrone chamber (not shown), focal length data f of a lens from an output of an zoom encoder or detector (not shown), and a luminance value LV from an output of a light-receiving element (not shown) are input. In step 104, an exposure value $EV = LV + SV$ is calculated.

In step 106, the correction circuit 3 reads out a correction amount $\Delta EV(f)$ at the focal length f from Table 2. In step 108, the correction circuit 3 calculates a corrected exposure value $EV' = EV - \Delta EV(f)$ on the basis of equation (2) so as to refer to the first table.

In step 110, the full-open exposure value calculator 4 reads out a full-open exposure value $EVz(f)$, with which the shutter blades are fully opened, from Table 5 in accordance with the focal length f.

In step 112, the comparator 5 compares the full-open exposure value $EVz(f)$ and the corrected exposure value $EV'$ to determine whether correct exposure can be obtained before or after the shutter blades are fully opened. If $EV' \geq EVz(f)$, the comparator 5 determines that correct exposure can be obtained before the shutter blades are fully opened. If $EV' < EVz(f)$, the comparator 5 determines that correct exposure can be obtained after the shutter blades are fully opened.

If it is determined that correct exposure can be obtained before the full-open of the shutter blades, the selector 9 supplies the corrected exposure value $EV'$ to the first table 6 and reads out the shutter-blade aperture time T from Table 1 using the value $EV'$ as EV, in step 114. In step 116, the shutter-close timing calculator 8 sets the shutter close timing $Ts = T$.

If it is determined that correct exposure can be obtained after the full-open of the shutter blades, the correction circuit 3 reads out a correction amount $\Delta EV'(f)$ at the focal length f from Table 3 in step 118, and calculates a corrected exposure value $EV'' = EV - \Delta EV'(f)$ on the basis of equation (4) in order to refer to the second table, in step 120. In step 122, the correction circuit 3 supplies the corrected exposure value $EV''$ to the second table 7, and reads out an effective exposure time $T'$ from Table 4 using the value $EV''$ as EV. In step 124, the selector 9 supplies the full-open exposure value $EVz(f)$ to the first table 6, and reads out the shutter aperture time T from Table 1 using $EVz(f)$ as EV. In step 126, the readout time T is set to be a full-open aperture time $T1$ of the shutter blades. In step 128, $T' + 0.5 \times T1$ is set to be the shutter-close timing Ts.

According to the first embodiment, shutter-close timings when correct exposure is obtained after the full-open of the shutter blades are separately obtained with reference to an effective exposure time and a shutter full-open aperture time. Thus, a correspondence table of the exposure value and the shutter aperture time used for obtaining the shutter-close timing when correct exposure is obtained before the full-open of the shutter blades can be used. In addition to this table, a correspondence table of the exposure value and the effective exposure time need only be prepared. Thus, long-time exposure can be controlled with a simple method.

A second embodiment wherein a flash timing of a flashmatic type electronic flash is controlled using the first table 6 of the first embodiment will be described below. In this flash, a guide number is changed in accordance with a change in focal length. FIG. 6 is a block diagram showing the principle of the second embodiment. Based on object distance data d, speed data SV representing film sensitivity (ISO) data, and a guide number $GNo(f)$, a calculator 12 calculates a flashmatic exposure value $EV(FM)$ used in place of an exposure value EV so that a shutter-blade aperture time shown in Table 1 is corresponded to an aperture value in a flashmatic mode. The exposure value $EV(FM)$ is supplied to a correction circuit 3, and is corrected in accordance with a difference between an actual focal length of the lens and a focal length used to prepare Table 1 as in the first embodiment.

A corrected exposure value $EV'$ (FM) and a full-open exposure value $EVz(f)$ are supplied to a comparator 5 and a selector 9. The selector 9 supplies one of $EV'(FM)$ and $EVz(f)$ to a first table 6 in accordance with a comparison result therebetween. The first table 6 stores Table 1 for defining a relationship between the exposure value EV and a shutter aperture time T in the case of exposure control under natural light used in the first embodiment. The shutter-blade aperture time T read out from the table 6 is input to a flash timing generator 14. When the shutter blades are opened to have a correct aperture value according to the time T, a flash signal Tf is generated.

Flash timing control will be explained below. In flashmatic control, an aperture value can be obtained in accordance with a guide number and a film sensitivity. In this embodiment, as will be described below, the aperture value can be considered as the shutter-blade aperture time T, and hence, Table 1 can be used.

In FIG. 2, if a gradient of an aperture time line at an arbitrary focal length f is represented by a, an aperture time T is expressed as follows:

$$T = 1/(a \times F^2) \ldots \quad (6)$$

In general, a formula of an exposure value in an apex arithmetic operation is represented as follows:

$$EV = \log_2(2 \times F^2/T) \ldots \quad (7)$$

When equation (6) is substituted in equation (7), the following equation can be obtained:

$$EV = \log_2(2 \times a \times F^4) \ldots \quad (8)$$

An aperture value in a flashmatic mode is expressed as follows:

$$F = (GNo(f)/d) \sqrt{S} /100 \quad (9)$$

where d is the object distance, S is the film sensitivity, and GNo(f) is the flash guide number. The flash guide number changes in accordance with a change in focal length.

For this reason, when equation (9) is substituted in equation (8), an aperture value in the flashmatic mode can be substituted with a pseudo exposure value. The pseudo exposure value is expressed as:

$$EV(FM) = \log_2\{2 \times a \times (GNo(f)/d)^4 \times (S/100)^2\} \ldots \quad (10)$$

If $\log_2 GNo(f) = GV$, $\log_2 S$ 32 SV, and $\log_2 d = DV$, equation (10) can be rewritten as:

$$EV(FM) = \log_2(-2 \times a) + 4 \times GV + 2 \times (SV-5) - 4 \times DV \ldots \quad (11)$$

Figure 7:
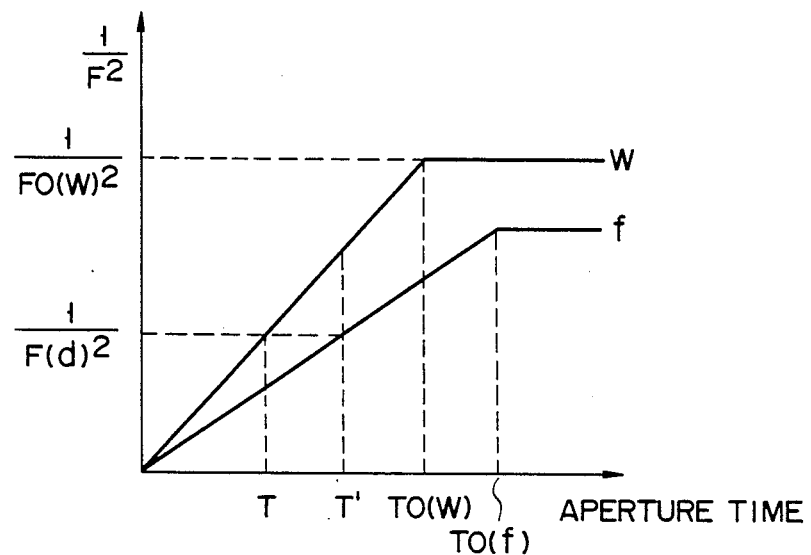
FIG. 7 is a graph showing an aperture waveform of shutter blades for explaining flash control.

Furthermore, as shown in FIG. 7, at an arbitrary object distance d, if a difference between an EV value at a wide end W and an EV value at the wide end W corresponding to the aperture time T' at an arbitrary focal length f is given by:

$$\Delta EV(FM) = EV(W,T) - EV(W,T') \quad (12)$$
$$= 2 \times \log_2\{Fo(W)^2 \, To(W)/Fo(f)^2 \, To(f)\}$$

From equation (1), equation (12) can be rewritten as:

$$\Delta EV(FM) = 2 \times \Delta EV(f) \ldots \quad (13)$$

$\Delta EV(f)$ is stored in Table 2.

In equation (11), if the gradient of the aperture time line is replaced with a gradient at the wide end W, $$EV(FM) = \log_2(2/Fo(W)^2 To(W)) + 4 \times GV + 2 \times (SV-5) - 4 \times DV \ldots \quad (14)$$

The pseudo exposure value EV' (FM) at an arbitrary focal length f can be expressed as follows taking a shift amount $\Delta EV$ FM) into consideration in equation (14):

$$EV'(FM) = EV(FM) + \Delta EV(FM) \ldots \quad (15)$$

If GV, SV, DV, and $\Delta EV(f)$ can be determined, a flash timing at which correct exposure can be obtained upon light emission of the flash can be determined by referring to Table 1. DV is determined as follows:

TABLE 6

| Object Distance (d) Zone | | | DV |
|---|---|---|---|
| 14.7162 | to | 15.9367 | 4 |
| 13.67 | to | 14.7162 | 3.875 |
| 11.97 | to | 13.67 | 3.75 |
| 11.27 | to | 11.97 | 3.625 |
| 10.6478 | to | 11.27 | 3.5 |
| 9.59 | to | 10.6478 | 3.375 |
| 8.72454 | to | 9.59 | 3.25 |
| 8.00333 | to | 8.72454 | 3.125 |
| 7.39308 | to | 8.00333 | 3 |
| 6.63552 | to | 7.39308 | 2.875 |
| 6.21194 | to | 6.63552 | 2.75 |
| 5.67 | to | 6.21194 | 2.625 |
| 5.21595 | to | 5.67 | 2.5 |

TABLE 6-continued

| Object Distance (d) Zone | | | DV |
|---|---|---|---|
| 4.7139 | to | 5.21595 | 2.375 |
| 4.39727 | to | 4.7139 | 2.25 |
| 4.03667 | to | 4.39727 | 2.125 |
| 3.66245 | to | 4.03667 | 2 |
| 3.35276 | to | 3.66245 | 1.875 |
| 3.09222 | to | 3.35276 | 1.75 |
| 2.82942 | to | 3.09222 | 1.625 |
| 2.60867 | to | 2.82942 | 1.5 |
| 2.39195 | to | 2.60867 | 1.375 |
| 2.18556 | to | 2.39195 | 1.25 |
| 1.99323 | to | 2.18556 | 1.125 |
| 1.83296 | to | 1.99323 | 1 |
| 1.68356 | to | 1.83296 | 0.875 |
| 1.54597 | to | 1.68356 | 0.75 |
| 1.41085 | to | 1.54597 | 0.625 |
| 1.29839 | to | 1.41085 | 0.5 |
| 1.19 | to | 1.29839 | 0.375 |
| 1.08818 | to | 1.19 | 0.25 |
| 0.99878 | to | 1.08818 | 0.125 |
| 0.916222 | to | 0.99878 | 0 |
| 0.84085 | to | 0.916222 | −0.125 |
| 0.77 | to | 0.84085 | −0.25 |

Figure 8:
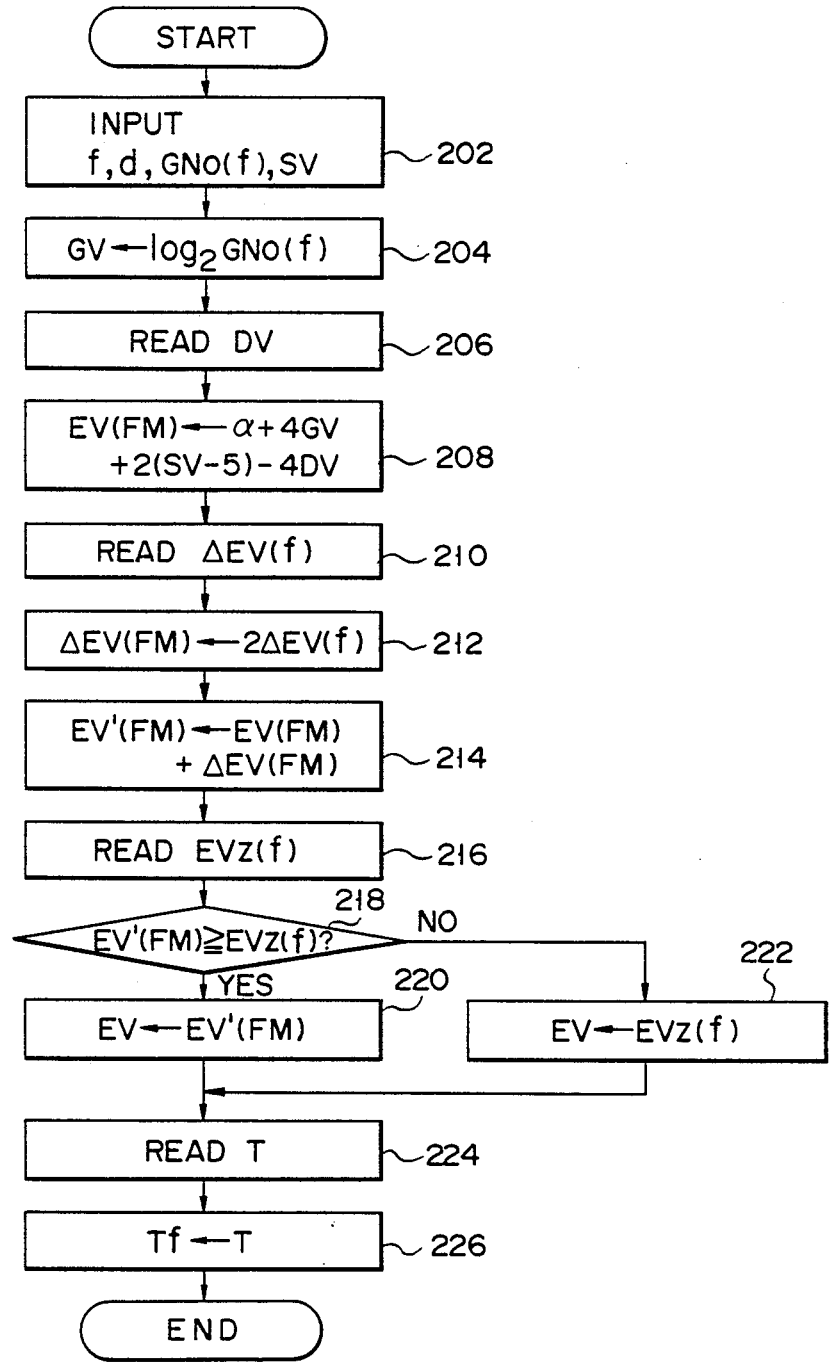
FIG. 8 is a flow chart showing flash control according to the second embodiment.

Flash control according to the second embodiment will now be described with reference to a flow chart shown in FIG. 8. In step 202, focal length data f, object distance data d, guide number data GNo(f), and speed value SV representing film sensitivity (ISO) data are fetched. In step 204, a guide number value GV =log$_2$-GNo(f) is calculated. In step 206, an object distance value DV is fetched from Table 6. In step 208, a pseudo exposure value EV(FM) in a flashmatic mode is calculated in accordance with equation (14). Here, αrepresents EV(FM)=log$_2$(2/Fo(W)$^2$ To(W)). In step 210, a correction amount $\Delta EV(f)$ is fetched from Table 2. In step 212, a correction amount $\Delta EV(FM) = 2\Delta EV(f)$ of the pseudo exposure value is calculated according to equation (13). In step 214, a pseudo corrected exposure value EV'(FM)=EV(FM) +$\Delta EV$(FM) is calculated in accordance with equation (15). In step 216, the full-open exposure value calculator 4 reads out a full-open exposure value EVz(f) from Table 4 in accordance with f. In step 218, the full-open exposure value EVz(f) is compared with a corrected exposure value EV'(FM). If EV'(FM)≧EVz(f), EV'(FM) is set as EV in step 220. If EV'(FM) <EVz(f), EVz(f) is set as EV in step 222. In step 224, a shutter-blade aperture time T is read out from Table 1 using the EV. The time T is set as a flash timing Tf in step 226. Thus, the flash timing of the electronic flash can be determined using Table 1, and a table exclusively used for flash control can be omitted.

As described above, according to the second embodiment, in a lens shutter camera having a 200 m lens or plural lenses which changes an aperture size in a full-open state in accordance with a change in focal length, the table storing the relationship between the exposure value and the shutter aperture time used for exposure control under natural light can be used for flashmatic control by replacing an aperture value in a flashmatic mode with a pseudo exposure value. Thus, flashmatic control of an electronic flash can be performed at low cost without increasing a memory capacity.

The present invention is not limited to the above embodiments, and various changes and modifications may be made within the spirit and scope of the invention. Numerical values in the above tables are presented for the purpose of descriptive convenience, and are not limited to those. For example, the second embodiment relates to only flash control. However, the pseudo exposure value calculator 12, the flash timing generator 14 and a mode selector for selecting one of flash-mode and a normal light mode can be added to the first embodiment, so that the apparatus may be modified to perform both exposure control under natural light and exposure control using flash light.

What is claimed is:

1. An exposure control apparatus for a lens-shutter type camera having a lens whose focal length can be varied and shutter blades whose aperture size in a full-open state changes in accordance with a change in the focal length of the lens and which serve as an aperture, comprising:

first table means for storing a correspondence between a luminance of an object to be photographed and a shutter-blade aperture time at a specific focal length;

second table means for storing a correspondence between the luminance of the object and an effective exposure time at the specific focal length;

correction means for correcting the luminance of the object in accordance with a difference between the specific focal length and the focal length of said lens for said first and second table means, respectively, so as to calculate first and second corrected luminance;

full-open luminance calculating means for calculating, in accordance with the focal length of said lens, a full-open luminance as the luminance of the object with which said shutter blades are fully opened;

determination means for comparing the first corrected luminance and the full-open luminance to determine whether correct exposure can be obtained before or after said shutter blades are fully opened;

supply means for supplying the first corrected luminance or the full-open luminance to said first table means in accordance with an output from said determination means, said supply means supplying the first corrected luminance to said first table means when said determination means determines that correct exposure is obtained before the shutter blades are fully opened, and supplying the full-open luminance to said first table means when said determination means determines that correct exposure is obtained after the shutter blades are fully opened; and control means for controlling a shutter-blade close timing by outputs from said first and second table means in accordance with an output from said determination means, said control means determining a close timing using the shutter-blade aperture time output from said first table means on the basis of the first corrected luminance when said determination means determines that correct exposure is obtained before the shutter blades are fully opened, and determining a close timing using a sum of the effective exposure time output from said second table means on the basis of the second corrected luminance and a half of the shutter-blade aperture time output from said first table means on the basis of the full-open luminance when said determination means determines that correct exposure is obtained after the shutter blades are fully opened.

2. An apparatus according to claim 1, in which said luminance is an exposure value.

3. An apparatus according to claim 2, in which the specific focal length is a shortest focal length, and
said correction means subtracts a correction amount $\Delta EV(f) = \log_2\{(Fo(W)^2 To(W))/(Fo(f)^2 To(f))\}$ from the exposure value to calculate a first corrected exposure value, and subtracts a correction amount $\Delta EV'(f) = \log_2(Fo(W)/Fo(f))^2$ from the exposure value to calculate a second corrected exposure value,
where $Fo(W)$ is the full-open aperture value at a shortest focal length, $Fo(f)$ is the full-open aperture value at an arbitrary focal length, $To(W)$ is the time until said shutter blades are fully opened at the shortest focal length, and $To(f)$ is the time until said shutter blades are fully opened at the arbitrary focal length.

4. An apparatus according to claim 3, in which said correction means stores a correspondence table of focal lengths f and correction amounts $EV(f)$ and $\Delta EV'(f)$.

5. An apparatus according to claim 2, in which said full-open luminance calculating means stores a correspondence table of focal lengths f and full-open exposure values.

6. An exposure control apparatus for a lens-shutter type camera having a lens whose focal length can be varied, shutter blades whose aperture size in a full-open state changes in accordance with a change in the focal length of the lens and which serve as an aperture, and a flashmatic type electronic flash whose guide number changes in accordance with the change in the focal length of said lens, comprising:

pseudo luminance calculating means for calculating a pseudo object luminance equivalent to an aperture value in a flashmatic mode on the basis of object distance data, film sensitivity data, and guide number data;

table means for storing a correspondence between a luminance of an object to be photographed and a shutter-blade aperture time at a specific focal length;

correction means for correcting the pseudo object luminance in accordance with a difference between the specific focal length and the focal length of said lens;

full-open luminance calculating means for calculating, in accordance with a focal length of said lens, a full-open luminance corresponding to the luminance of the object with which said shutter blades are fully opened;

comparison means for comparing the corrected luminance and the full-open luminance;

supply means for supplying the corrected luminance or the full-open luminance in accordance with a comparison result from said comparison means, said supply means supplying a larger one of the corrected luminance and the full-open luminance; and means for controlling a flash start timing on the basis of a time read out from said table means in accordance with the corrected luminance or the full-open luminance.

7. An apparatus according to claim 6, in which said luminance is an exposure value.

8. An apparatus according to claim 7, in which the specific focal length is a shortest focal length,
said pseudo luminance calculating means calculates a pseudo exposure value $EV(FM) = \log_2(2/Fo(W)^2$ To(W)) $+4\times GV+2\times(SV-5)-4\times DV$ used for the shortest focal length, and said correction means adds to the pseudo exposure value a correction value $2\times\Delta EV(f)=2\times\log_2\{(Fo(W)^2 To(W))/(Fo(f)^2 To(f))\}$ to calculate a corrected exposure value, where GV is the flash guide number value, SV is the speed value, DV is the object distance value, Fo(W) is the full-open aperture value for the shortest focal length, Fo(f) is the full-open aperture value at an arbitrary focal length f, To(W) is the time until said shutter blades are fully opened at the shortest focal length, and To(f) is the time until said shutter blades are fully opened at the arbitrary focal length f.

9. An apparatus according to claim 8, in which said correction means stores a correspondence table of focal lengths f and correction amounts $\Delta EV(f)$.

10. An apparatus according to claim 7, in which said full-open luminance calculating means stores a correspondence table of focal lengths f and full-open exposure values.

* * * * *